(12) United States Patent
Robertson et al.

(10) Patent No.: US 10,885,251 B2
(45) Date of Patent: Jan. 5, 2021

(54) SOFTWARE INTEGRATION INTO HARDWARE VERIFICATION

(71) Applicant: BAE Systems Information and Electronic Systems Integration Inc., Nashua, NH (US)

(72) Inventors: Jeffrey E. Robertson, Ashubrn, VA (US); Mary T. Hanley, Ashburn, VA (US); Elizabeth J. Williams, Warrenton, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 50 days.

(21) Appl. No.: 16/282,442

(22) Filed: Feb. 22, 2019

(65) Prior Publication Data
US 2020/0272701 A1 Aug. 27, 2020

(51) Int. Cl.
G06F 30/33 (2020.01)
G06F 30/3323 (2020.01)

(52) U.S. Cl.
CPC ............... G06F 30/3323 (2020.01)

(58) Field of Classification Search
CPC ........ G06F 30/33; G06F 30/331; G06F 30/30; G06F 2117/08; G06F 1/3206; G06F 1/3234; G06F 1/3287; G06F 11/261; G06F 2215/08; G06F 30/3323; G06F 13/22; G06F 13/4022; G06F 13/4291; G06F 15/7817; G06F 30/327; G06F 30/34; G06F 8/44; G06F 8/52; G06F 9/44505; G06F 11/3616; G06F 11/3664; G06F 15/7864; G06F 19/321; G06F 2115/10; G06F 2119/12; G06F 30/3312; G06F 30/39; G06F 8/30; G06F 8/35; G06F 8/443; G06F 9/4411; G06F 2111/04; G06F 2111/20; G06F 2117/02; G06F 30/394; G06F 17/50; G06F 9/44; G06F 9/455; G06F 1/32; G06F 9/00;
(Continued)

(56) References Cited

U.S. PATENT DOCUMENTS 9,460,261 B2    10/2016  Raghavan et al.
2010/0306728 A1* 12/2010 Ardeishar ............... G06F 30/30
                                                    716/106
(Continued)

OTHER PUBLICATIONS

Universal Verification Methodology, see https://en.wikipedia.org/wiki/Universal_Verification_Methodology.

Primary Examiner — Binh C Tat
(74) Attorney, Agent, or Firm — Maine Cernota & Rardin; Scott J. Asmus

(57) ABSTRACT

A system and method of verifying hardware that includes software configured to control its operation, the method comprising providing an abstracted version of hardware to be tested; verifying the functionality of the hardware; writing test bench software using physical-layer routines; drafting hybrid verification intellectual property modules, wherein the hybrid verification intellectual property modules comprise both synthesizable and non-synthesizable code and are configured to stimulate the abstracted hardware and to test software anticipated to be used in connection therewith; and creating network-level routines that can be passed to physical-layer routines as part of a hardware verification process.

17 Claims, 4 Drawing Sheets

(58) Field of Classification Search
CPC ... G06F 9/45; G06F 7/48; G06F 11/36; G06F 13/40; G06F 15/78; G06F 7/38; G06F 9/445; G06F 11/22; G06F 11/26; G06F 13/00; G06F 13/10; G06F 13/12; G06F 19/00; G06N 3/0445; G06N 7/005; G01R 31/31704; G01R 31/318335; G01R 31/318357; G01R 31/318364; G01R 31/317; G01R 31/3183; G06K 9/00973
USPC .................................................. 716/100–109
See application file for complete search history.

(56) References Cited

U.S. PATENT DOCUMENTS

2014/0089872 A1\* 3/2014 Galpin .................... G06F 30/33
716/102
2017/0115969 A1\* 4/2017 Pendharkar ......... G06F 11/3664

\* cited by examiner

SOFTWARE INTEGRATION INTO HARDWARE VERIFICATION

FIELD

The disclosure relates to software, and more particularly, to systems and methods for enabling faster, more efficient, more flexible, and more robust design of hardware and software used to enable the operation thereof.

BACKGROUND

The design of hardware, and the software that enables it to operate, is a lengthy, complicated, and often difficult process. Hardware relies on software to control the stimulation of various sub-components thereof, with packet and network-level, i.e. software, protocols driving, in some cases, high bandwidth input/output (I/O) operations of the hardware on which other hardware may depend. This software, in the form of assembled code, typically runs on microcontrollers and microprocessors.

Before a software engineer can begin to write code that will be used to enable the hardware to operate, the hardware must be provided or simulated. Where the hardware is simulated, this often requires the software engineer to utilize physical layer, i.e. character-level, protocols (i.e. 1s and 0s) to translate network-level protocols (assembled characters are equivalent to packets and assembled packets are equivalent to network-level protocols or network communications). Physical layer protocols, while familiar to hardware engineers, are often not familiar to software engineers. Furthermore, software engineers are not typically familiar with hardware verification tools that are typically used to verify the simulated hardware to ensure it replicates the intended behavior of the actual hardware prior to designing software to operate it.

Moreover, software engineers typically do not have access to physical hardware during design and prototyping phases thereof. This is because hardware is often defined, in these early stages, as merely a combination of modules that process inputs in defined ways to produce outputs, as opposed to actual circuits, which are usually developed later in the process. Often, the actual circuits that allow the hardware to function are developed using software designed for that purpose and tested only after the boards are manufactured. At this late stage of production, changes to the hardware are problematic, being both expensive and time consuming as they generally require changes to tooling and other relatively expensive and specialized manufacturing equipment.

This requires the software engineer to engage in lab debugging, or testing, of software with limited visibility into the actual circuits that make up the hardware, often late in the development cycle of the product, which is described in FIG. 1. In most cases, lab debugging takes place only after hardware verification is complete, since hardware engineers do not typically write routines for simulation that can be leveraged by software engineers and may not even be privy to the software strategy intended for the system. Furthermore, most software cannot be simulated in its entirety using hardware simulation tools, primarily due to tool and time constraints (e.g. one second of simulation can take 8 hours of real-world, i.e. "wall clock", time).

Also problematic is that physical layer inputs to simulated or actual hardware, which are designed to stimulate the various inputs thereof programmatically, often fail to do so in a realistic way, as they are not designed to simulate real-world software or functions, but only to methodically stimulate the various components that make up the hardware. This is compounded by the simulated hardware sometimes not properly reflecting the behavior of the final design, which can be due to the implementation of circuitry associated with the modules behaving in unexpected ways under certain conditions. For example, race conditions might only show up under more realistic usage patterns and, even then, can be difficult to detect.

In the specific context of software used to control hardware that controls various aspects of manned and unmanned flight, herein referred to as flight software, these concerns loom particularly large. This is, in part, because such software is often very complex, and therefore computationally expensive to simulate. It is also because such software must be rigorously tested to ensure that it is robust enough to be trusted to control aspects of flight, as the consequences of a hardware failure could be dire (e.g. the loss of life and/or millions of dollars of equipment).

What is needed, therefore, are robust and flexible systems and methods that allow for hardware and software engineers to more efficiently and more quickly work towards their common goal of producing a finished product comprising both hardware and software that allows for needed changes to be made relatively early in the process, when they are far less expensive and time consuming to implement.

SUMMARY

By implementing systems and methods including testing frameworks that more test hardware under real world condition and/or embedding a software engineer or group of software engineers into a hardware engineering team early in the development of a product and forcing the hardware engineering team to utilize resources familiar to software engineers, finished products may be more efficiently produced by allowing both teams to detect issues at an early stage of development, when these issues can still be remedied relatively easily and without significant rework.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
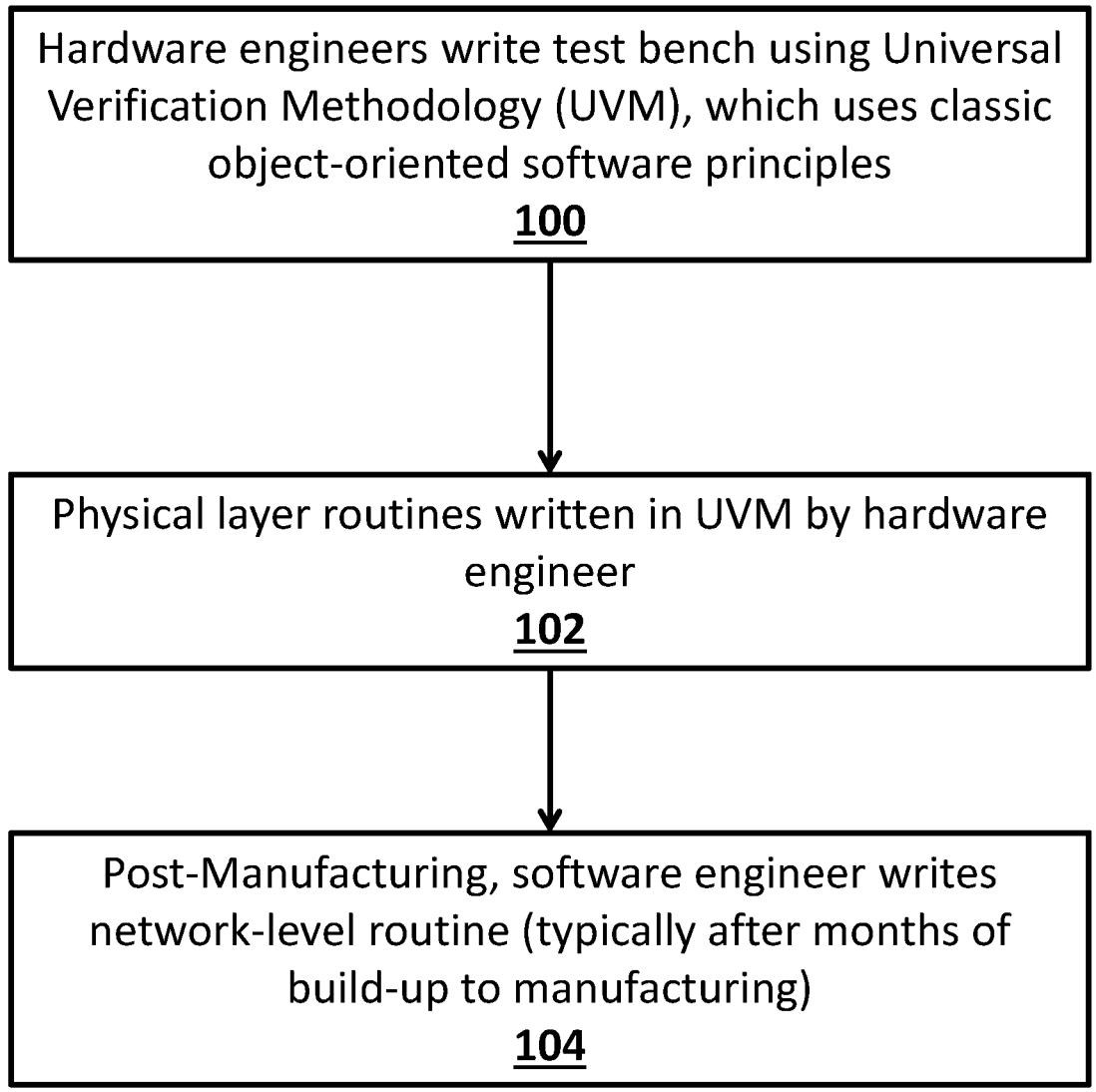
FIG. 1 is a flowchart detailing the primary steps of a typical hardware/software development cycle.

As a preliminary matter, Universal Verification Methodology (UVM) is a term used herein to describe a standardized methodology for verifying integrated circuit designs. UVM is derived mainly from the OVM (Open Verification Methodology) which was, in large part, based on the eRM (e Reuse Methodology) for the e Verification Language developed by Verisity Design in 2001. The UVM class library brings much automation to the SystemVerilog™ language, such as sequences and data automation features (e.g. packing, copy, compare, etc.), and, unlike previous methodologies developed independently by the simulator vendors, is an Accellera standard supported by multiple vendors, including Aldec, Cadence, Mentor®, and Synopsys.

Furthermore, UVM has multiple parts, including at least one sequence, which is responsible for three main functions: 1. Put the DUV (Design Under Verification) 202 or DUT (Device Under Test) 202 and the verification or test environment 200 into an initialization state; 2. Configure the verification or test environment 200 and DUV 202 or DUT 202; and 3. Generate a DUV 202 or DUT 202 scenario.

UVM also includes an initialization stage, in which the DUV 202 or DUT 202 and the test environment 200 it is placed in are set to the conditions desired before the simulation. Ordinarily, this includes: loading memory with any type of needed initial conditions; pinning settings on the DUV 202 or DUT 202, such as power and high impedance; setting register settings that cannot be altered during simulation, such as mode bits; and setting verification component settings that cannot be altered during simulation.

Said another way, UVM is a methodology for the functional verification of digital hardware, primarily using simulation. The hardware or system to be verified is typically described using Verilog™ SystemVerilog™, VHDL™ or System C™ at any appropriate abstraction level, although alternative languages could be used and would be known to one of ordinary skill in the art.

UVM verification could be behavioral, register transfer level, or gate level. UVM is explicitly simulation-oriented, but can also be used alongside assertion-based verification, hardware acceleration, or emulation.

Also discussed herein is SystemVerilog™. SystemVerilog™, which is standardized as IEEE 1800, is a hardware description and hardware verification language used to model, design, simulate, test and implement electronic systems. SystemVerilog™ is based on Verilog™, a verification language, but includes some extensions that allow for additional functionality. SystemVerilog™, when used for verification purposes, typically uses extensive object-oriented programming techniques that would be familiar to software engineers, and is more closely related to Java® than Verilog™.

Lastly, VIP (Verification Intellectual Property) 206 refers to pre-defined functional blocks used during the hardware verification process that may be reused in future projects, especially those involving compliance with the same or similar standards. An example of related projects that would be particularly well suited to reuse of VIP 206 include those dealing with space-based resources, due to the frequent cooperation between many different organizations based in a variety of countries and the enhanced need for hardware and software to work together without issue that arises due to the expense and impact of failures on such programs. An example of such a standard is the SpaceWire protocol, which is a standard used on the current line of space-qualified ASICs/FPGAs. Military and aerospace have similar requirements and standards, such as SRIO (Serial Rapid Input/Output) and could similarly benefit from such VIP 206.

This disclosure also utilizes a number of terms and acronyms, which, for clarity, are set forth and defined below:
Agent—A container that emulates and verifies DUT devices;
API—Application Programming Interface
BFM—Bus Functional Model, see VIP.
Blocking—An interface that blocks tasks from other interfaces until it completes;
Byte—A group of binary digits or bits (usually eight) operated on as a unit;
Character-level—0s and 1s that represent electrical charges;
Component—A portion of verification intellectual property that has interfaces and functions;
DUT—Device under test, what you are actually testing
DUV—Device Under Verification, used interchangeably with DUT;
Messages—User-defined data that uses a protocol;
Network-level protocol—A collection of packets;
Non-Synthesizable code—Code that cannot be converted directly into manufacturable hardware;
Packet—A collection of bytes;
Physical layer—In the seven-layer OSI model of computer networking, the physical layer, layer 1, is the first and lowest layer and consists of the electronic circuit transmission technologies of a network. It is a fundamental layer underlying the higher level functions in a network where information is transmitted as raw bits, as opposed to logical data packets.
RTL—Register Transfer Language, the language that hardware is typically written in, i.e. an abstraction of the hardware;
Transactor—See component;
Synthesizable Code—Code that can be converted directly into manufacturable hardware (e.g. RTL)
Verification Environment Configuration—Those settings in the DUT and test environment that are alterable while the simulation is running; and
VIP—Verification Intellectual Property, pre-defined functional blocks used during the hardware verification process that may be reused in future projects. This is also referred to herein as BFM. VIPs can be anything from a one-directional simple pulse generator on a single wire to a complicated algorithm or protocol. While BFMs, in practice, tend to be more limited in scope and associated with emulation of a protocol that does more involved handshaking or training of an interface, compared with VIPs, the terms are used interchangeably herein.

A typical prior art hardware and software development technique is outlined in FIG. 1. This method involves hardware engineers writing a test bench using Universal Verification Methodology (UVM), which uses classic object-oriented software principles 100, then writing physical-layer routines in UVM 102, and finally, post-manufacturing of the hardware, tasking a software engineer with writing network-level routines to test the hardware, usually after months of build-up to manufacturing 104.

Figure 2:
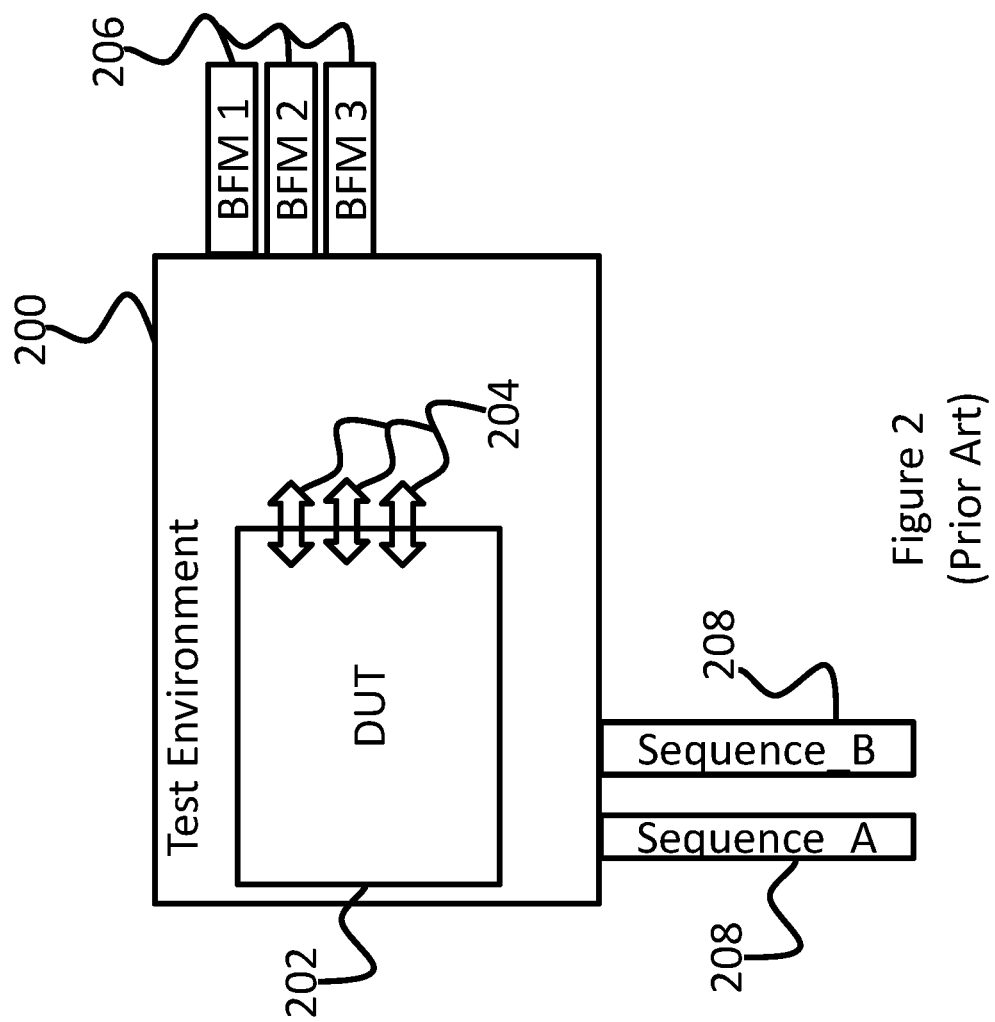
FIG. 2 is a schematic describing a test environment and its interaction with a Device Under Test (DUT)

A schematic describing a typical, prior art testing framework is schematically-described in FIG. 2. More specifically, Figure two shows a test environment 200 containing a DUT 202 that is connected to the test environment 200 through interfaces 204, which may also be referred to herein as hooks 204, which allow the test environment 200 to programmatically wiggle (i.e. change the voltage/input signal on and/or observe the changing voltage/output signal of) various pins, whether virtual (i.e. simulated) or physical, of the DUT 202. Using the interfaces 204 in this way is designed to simulate an object connected to the DUT 202. The test environment 200 depicted also comprises Bus Functional Modules 206 (BFMs, i.e. BFM 1, BFM 2, and BFM 3), which may also be referred to herein as Verification Intellectual Property 206 or VIP modules 206, that drive and respond to the DUT 202 through interfaces 204. Lastly, the test environment 200 comprises sequences 208 (i.e. Sequence A 208 and Sequence B 208), which represent a sequence of steps that verify parts of the DUT 202 using the interfaces 204, BFMs 206, etc. In this environment the DUT 202 is tested by the BFMs 206 at the most primitive level; attempting to prove the DUT's 202 basic functions work as intended by sending simple packets/messages/characters, i.e. physical layer traffic thereto, as opposed to meaningful network traffic, and monitoring the DUT's 202 response.

Now regarding the present disclosure, by having a software engineer join the hardware engineering team early in the development of a product and having the hardware engineering team utilize resources familiar to software engineers, finished products may be more efficiently produced by providing opportunities for both teams to detect issues, each using its own unique skillset, at an early stage of development when these issues can still be remedied relatively easily.

Figure 3:
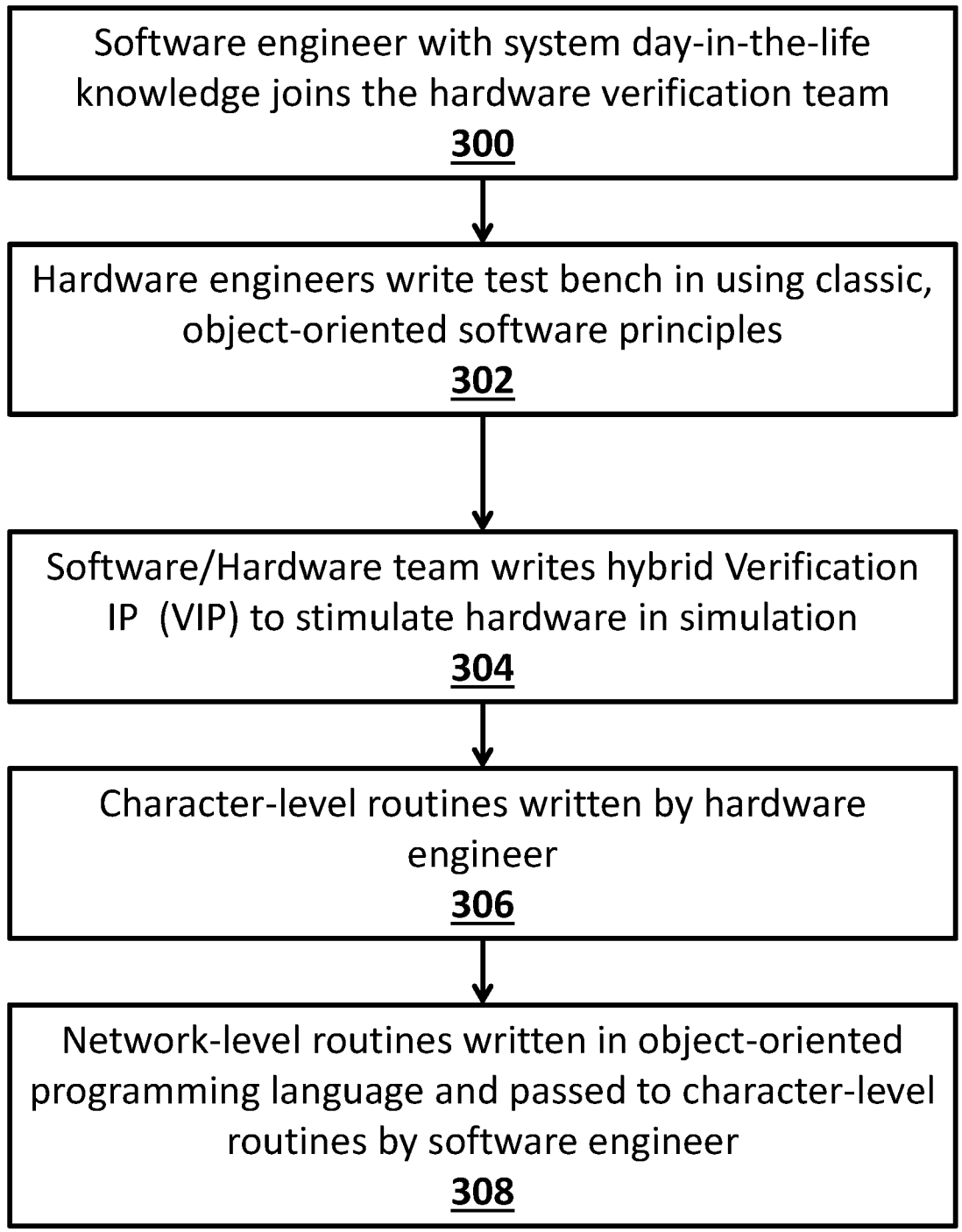
FIG. 3 is a flowchart describing a modified hardware/software development cycle, in accordance with embodiments of the present disclosure.

One embodiment of such a method is described FIG. 3 using a flowchart. FIG. 3 describes that, in an embodiment of the present disclosure, as a first step, a software engineer with system day-in-the-life knowledge (i.e. the software engineer is familiar with the tasks the hardware will have to perform) joins the hardware verification team 300. The next step is for the hardware engineers to write a test bench using classic, object-oriented software principles 302. Following this step, the software/hardware team writes a hybrid Verification IP (VIP) comprising both synthesizable and non-synthesizable code, which tests both hardware and software, to stimulate and observe the hardware in simulation 304. This allows the hardware team to test the circuitry and the software team to build pieces toward a final software solution. The software team's goal at this point is to test the hardware with meaningful data scenarios. In embodiments, reuseable tasks for the final software are also generated at this stage. Generally speaking, the limitation of the hardware simulator and the amount of wall-clock time it takes limits the software to basic routines, as opposed to final software.

Next, physical-layer routines are written by the hardware engineer 306. Lastly, network-level routines are written in an object-oriented programming language and passed to physical-layer routines by the software engineer(s) 308.

As a practical example, many systems are configured to send high-level application data from a hypothetical point A to a hypothetical point B. In many cases, the hardware and software team(s) do not know the content of the data, but merely provide a means to move it around. In these situations, network-level routines create messages that are eventually transported over the physical layer to be processed by the DUT 202 or sent by the DUT 202 to the test environment for verification (i.e. to verify the movement of the data from point A to point B). In some cases, however, the DUT 202 itself acts upon the message (a command to the DUT 202 for instance). In these cases, the network-level routines send actual commands to the physical layer, process responses, or other DUT 202 generated messages from the physical layer.

In embodiments, the hybrid VIP 206 comprises a hybrid SystemVerilog™/Object oriented code Verification IP 206. Physical-layer routines used in such embodiments may be written in SV-UVM by the hardware engineer while network-level routines may be written in C++ and passed to physical-layer routines by the software engineer. In the context of such testing, a high-level command may be to read-out a certain portion of memory while a low-level input may be a string of pseudo-random characters.

In embodiments, software may already exist to translate application level messages into network/packet/byte-level data. This data, in embodiments, is given to the VIP 206, which converts it to the physical layer data. In some cases, the DUT's 202 response to the VIP 206 converts the physical layer back to bytes and passes it to software that converts it to packets, network protocols, and, eventually, an application message. In other cases the software stack does not exist and is developed in parallel. In both cases an important aspect is the translation of the bytes to physical-layer data, as, when combined with the network/packet, this allows for the rich complexity described elsewhere herein.

In embodiments, an integrated software debug GUI environment capable of reading/writing to memory, setting breakpoints, stepping through code, etc. is designed to interact with the test environment 200 and may be incorporated into a hardware simulator, e.g. a UVM test bench, while, in other embodiments, a JTAG or other hardware interface is used to provide debugging capabilities.

In embodiments, the software engineer is also tasked with early development of day-in-the-life scenarios.

In embodiments, hardware engineers are tasked with writing test bench software using SystemVerilog™ (SV), which uses classic object-oriented software principles and has built-in strategies for leveraging C++ routines.

In such embodiments, time and cost are saved due to the upward mobility and project-to-project reuse inherent in such methods, including early prototype and verification of final software assumptions and implementation techniques. For example, software development gets a head start due to the reusability of some testing modules and code and because the software team has already spent time going through system scenarios.

In embodiments, a visual interpreter tool that shows the internal state of the program and evaluation of statements step-by-step is used in conjunction with the object-oriented programming language to assist hardware engineers in gaining a better understanding thereof.

Figure 4:
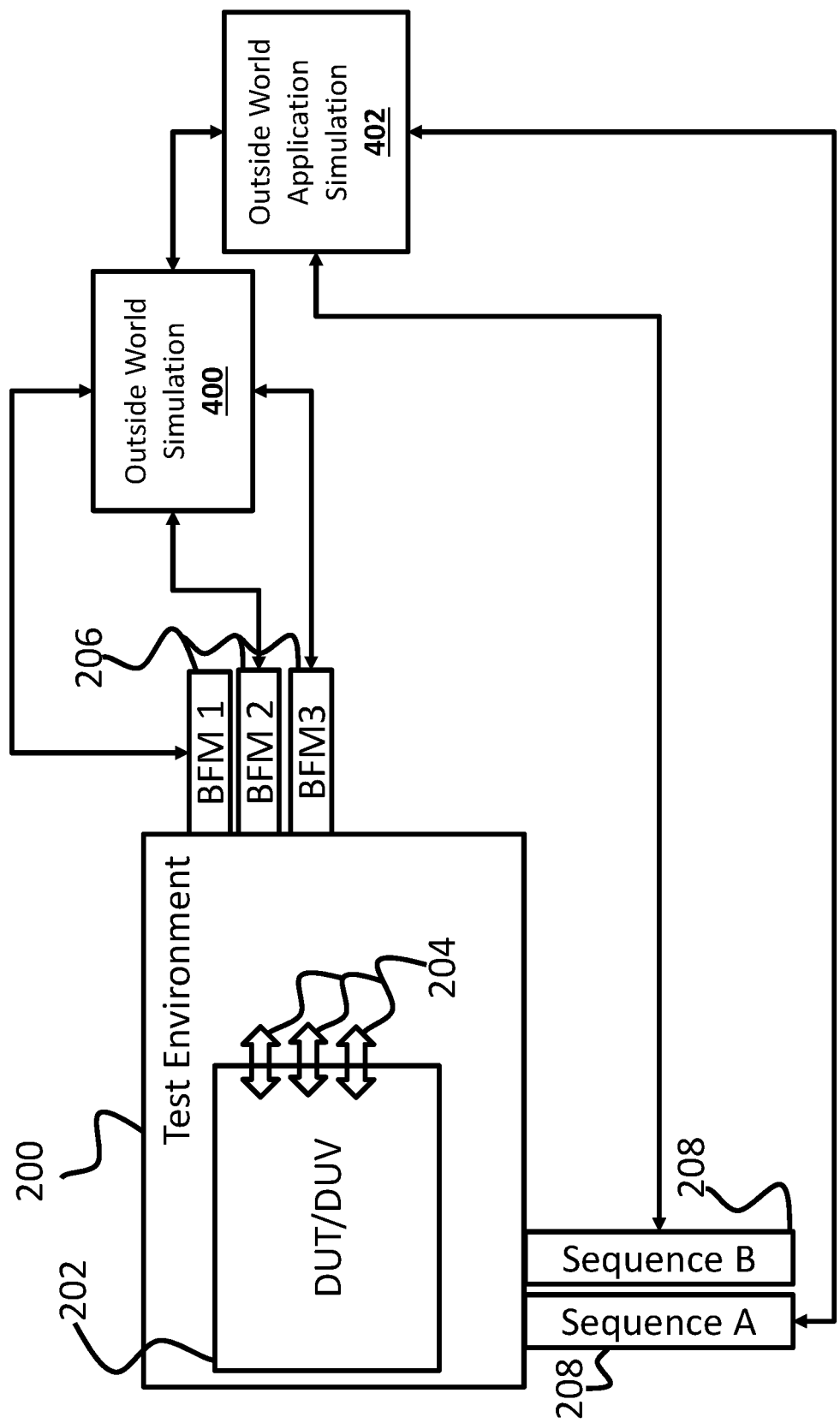
FIG. 4 is a schematic showing a modified test environment that incorporates an application simulation that uses an object-oriented programming language and that provides for monitoring of a DUT's response to the simulated environment, in accordance with embodiments, of the present disclosure.

Now referring to FIG. 4, a schematic showing a test environment 200, in embodiments a test environment 200, which may be a UVM test environment 200, in accordance with embodiments of the present disclosure. In FIG. 4, the test environment 200 incorporates at least one application simulation module 402 that, in embodiments, uses an object-oriented programming language and provides for monitoring of a DUT's 202 response to the simulated environment 200. Like the schematic of FIG. 2, which describes a prior art test environment 200, embodiments of the present disclosure also provide a test environment 200 within which a DUT 202 is placed, with the DUT 202 connected to the test environment 200 using interfaces 204 that allow the test environment 200 to programmatically wiggle various pins, whether virtual (i.e. simulated) or physical, of the DUT 202. The test environment 200 also comprises Bus Functional Modules 206 (BFMs, i.e. BFM 1, BFM 2, and BFM 3), which drive and respond to the DUT's interface(s) 204. Furthermore, the test environment 200 comprises sequences 208 (i.e. Sequence A and Sequence B), which represent a sequence of steps that verify parts of the DUT 202 using the interfaces 204, BFMs 206, etc.

In addition to these elements, however, embodiments of the present disclosure also include at least one outside world simulation module 400 and an outside world application simulation module 402.

The "outside world" of embodiments can take many forms. It could be hardware (for instance, an Analog-to-Digital (A/D) converter) or a combination of external hardware and software. For instance, a control program 402 talking to the DUT via SpaceWire 400. The latter case (software simulation and external hardware) tends to result in a more robust test environment, but some network protocols (such as SRIO) implement many levels of the protocol in hardware. An accurate simulation of external SRIO hardware entities will also generate a robust test environment. In this case, the outside world application simulation module 402 represents a network application implemented in hardware.

Because testing is of the DUT, as opposed to the outside world, liberties can be taken with the implementation (for example, sending messages faster to shorten simulation times, inserting errors, etc.). In general, however, the outside world is configured to behave in the way it is expected to during various operational scenarios.

The Outside world, in embodiments, is implemented in SystemVerilog and/or C/C++, although it could be implemented in any non-synthesizable code or object oriented code. In some cases, a subset of actual application or application prototype software may be used.

The addition of the simulation modules 400/402 allow for more complex bus interactions. For instance, complete system level interactions can be simulated between the outside world and the DUT 202 using these modules, where system level may be defined as simulation of things outside of the DUT 202. For example an application running on a host sending messages to the DUT 202 and responding to messages sent to the application from the DUT 202.

More specifically regarding the interaction of the various components, at a high level, tests run a sequence of events (commands) to stimulate the DUT 202. Sequence modules 208 configure the outside world modules 400/402 (i.e. the outside world simulation module 400 and outside world application simulation module 402) and monitor what they see for testing and/or verification purposes (for example: make sure the expected messages are received). The sequence modules 208 also are tasked with setting up the test environment 200 and initiating the outside world simulation module 400 and outside world application simulation module 402.

The multiple Bus Functional Models (BFMs) 206, which may also be referred to as Verification Intellectual Property (VIP) 206, are pre-defined and customized for the network protocol being tested (e.g. SRIO (Serial Rapid Input Output), SpaceWire, AXI™ (Advanced eXtensible Interface), etc.), as would be understood by one of ordinary skill in the art. The data is at character level upon its entry into or departure from a BFM 206. The VIP/BFM 206 act as bridges between the test environment 200 and outside world application simulation module 402 and outside world simulation modules 400. For complicated interfaces, like SRIO, this can be an entire simulation that converts physical-layer to bytes, to packets, to application messages. For relatively simple interfaces, such as SpaceWire, translating from physical-layer to bytes is all that is required.

The functions of the outside world simulation module 400 and the outside world application simulation module 402, in embodiments, are performed by a single module.

In embodiments, the outside world simulation module 400 and outside world application simulation modules 402 are software modules written in an object-oriented programming language, which, in embodiments is C or C++.

In embodiments, the outside world simulation module 400 and the outside world application simulation module 402 convert data from a network-level protocol to a physical-layer protocol prior to transmission thereof to a BFM 206, allowing for simulation of hardware in a test environment 200 that more closely tracks a DUT's 202 expected, real-world operation.

In embodiments, an API interface is provided that allows stimulation of the DUT 202 and offers debugging capability using existing GUI debuggers.

The teachings of the present disclosure provide early access to hardware via the simulation environment, hardware verification is tested using day-in-the-life scenarios, software engineers are provided additional visibility in debug scenarios, and software debug GUI's can be integrated into the simulation environment to create a software debugger feel in a hardware simulator that is more familiar to software engineers. In the context of flight software, the teachings of the present disclosure ensure that flight software is tested thoroughly under realistic conditions, improving the safety of real-world testing while making hardware and software development more efficient by reducing the potential for expensive and time consuming rework.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A method for verifying hardware that includes software configured to control its operation, the method comprising implementing at a computer product including one or more microprocessors and memory, the memory storing one or more programs configured for execution by the one more microprocessors for:
   providing an abstracted version of hardware comprised of at least one hardware description language;
   verifying the functionality of the abstracted version of hardware using Universal Verification Methodology (UVM);
   performing test bench sequences comprised of physical-layer routines written in the at least one hardware description languages, the physical-layer routines having UVM base classes;
   generating at least one outside world simulation module configured to simulate performance during at least one operational scenario;
   generating a plurality of hybrid verification intellectual property modules, wherein the hybrid verification intellectual property modules comprise both synthesizable and non-synthesizable code and are configured to stimulate the abstracted hardware and to test software anticipated to be used in connection therewith; and
   performing network-level routines written in an object-oriented programming language that can be passed to physical-layer routines as part of a hardware verification process.

2. The method of claim 1 wherein the abstracted version of hardware is abstracted using register transfer language.

3. The method of claim 1 wherein the network-level routines are written in an non-synthesizable programming language.

4. The method of claim 1 wherein the network-level routines are written in a programming language selected from the group consisting of Java, C#, C, and C++.

5. The method of claim 1 wherein the outside world simulation module comprises a plurality of Serial Rapid Input Output (SRIO) events.

6. A system for verifying hardware, the system comprising:
one or more microprocessors;
memory; and
one or more programs, wherein the one or more programs are stored in the memory and are configured for execution by the one or more microprocessors, the one or more programs including the instructions for:
generating a test environment comprising a device under test;
generating interfaces configured to connect inputs and outputs of the device under test to the test environment;
generating at least one verification intellectual property module in operative communication with the device under test through the test environment, wherein the at least one verification intellectual property module is configured to drive and/or respond to an interface of the device under test;
generating at least one simulation module configured to simulate network-level data and provide the network-level data to the device under test via the at least one verification intellectual property module, comprising the means to simulate performance during at least one outside world operational scenario; and
generating at least one sequence module in operative communication with the device under test and at least one simulation module, wherein the at least one sequence module is configured to cause the system's other components to carry out a sequence of predefined steps as part of a hardware verification process, and
wherein the at least one sequence module is capable of configuring the at least one simulation module and/or monitoring the device under test's responses thereto.

7. The system of claim 6 wherein the device under test is abstracted.

8. The system of claim 7 wherein the device under test is abstracted using register transfer language.

9. The system of claim 6 wherein each verification intellectual property module is hardware agnostic and customized for a specific network protocol to be tested.

10. The system of claim 6 wherein data input to or output from the at least one verification intellectual property module is at the physical layer.

11. The system of claim 6 wherein the at least one simulation module simulates real-world software or conditions using network-level protocols and the at least one verification intellectual property module converts these network-level protocols to physical layer protocols before transmitting them to the device under test via the interfaces.

12. The system of claim 6 wherein the at least one simulation module is configured to receive physical-layer protocols from the at least one verification intellectual property module and convert the physical-layer protocol to a network-level protocol.

13. The system of claim 6 wherein the at least one simulation module comprises:
a real world simulation module configured to simulate external hardware conditions that might be encountered by the device under test during real world usages; and
a real world application simulation module configured to simulate software that is anticipated to be used in connection with the hardware after testing.

14. The system of claim 10 wherein the programming language is non-synthesizable.

15. The system of claim 6 further comprising an application programming interface configured to allow debugging of the system using an existing debugger.

16. The system of claim 15 wherein the existing debugger comprises a graphical user interface.

17. A non-transitory computer readable storage medium storing one or more programs, the one or more programs comprising instructions, which when executed, cause a device to:
provide an abstracted version of hardware to be tested;
verify the functionality of the hardware;
generate test bench sequences comprised of physical-layer routines;
generate at least one outside world simulation module configured to simulate performance during at least one operational scenario;
generate hybrid verification intellectual property modules, wherein the hybrid verification intellectual property modules comprise both synthesizable and non-synthesizable code and are configured to stimulate the abstracted hardware and to test software anticipated to be used in connection therewith; and
generate network-level routines that can interact with physical-layer routines as part of a hardware verification process.

* * * * *